United States Patent [19]

Hawkins et al.

[11] 4,053,931
[45] Oct. 11, 1977

[54] ENHANCEMENT OF A VIDEO SIGNAL PRODUCED FROM INFORMATION STORED IN A DIGITAL MEMORY

[75] Inventors: Joseph Key Hawkins; Leo Francis Cavanaugh, both of San Diego, Calif.

[73] Assignee: Robot Research, Inc., San Diego, Calif.

[21] Appl. No.: 719,907

[22] Filed: Sept. 2, 1976

[51] Int. Cl.$^2$ ............................................. H04N 7/12
[52] U.S. Cl. .................................. 358/134; 358/133
[58] Field of Search ................ 358/134, 133, 140, 166

[56] References Cited

U.S. PATENT DOCUMENTS 3,941,921  3/1976  Yumde et al. ....................... 358/134
3,982,063  9/1976  Brown et al. ....................... 358/134

*Primary Examiner*—Richard Murray
*Attorney, Agent, or Firm*—Brown & Martin

[57] ABSTRACT

Apparatus for producing a video signal from digitally stored information representing the video signal intensity in each of a plurality of picture element locations within a plurality of scan lines. An analog video signal produced for display from the stored information is blanked during the first half of each picture element location during alternately displayed lines and blanked during the last half of each picture element location during the remaining alternately display lines. This apparatus is used in slow-scan television.

2 Claims, 11 Drawing Figures

ENHANCEMENT OF A VIDEO SIGNAL PRODUCED FROM INFORMATION STORED IN A DIGITAL MEMORY

BACKGROUND OF THE INVENTION

This invention generally relates to video signal processing and is specifically directed to enhancement of an analog video signal produced for display from information stored in digital form.

For various applications, such as in a slow-scan television system, it is desirable to perform a scan conversion process on pictorial information such that the rate of scanning the information is changed from a typical broadcast television scan rate to a slower rate for transmission of the information and then back again to the original rate for display on a television monitor. To accomplish this scan rate conversion, a memory for storing the picture information that is scanned or transmitted at the slower rate is required so that an entire picture may be viewed at one time. This is because the picture information is scanned and/or transmitted at too slow a rate for the entire picture to be displayed immediately upon receipt of the transmission within the persistence time of phosphors used on the face of television tubes. A digital memory is preferred because of its precise retention and accurate reproduction. A slow-scan television apparatus including a digital memory is described in an article by Steber, "SSTV to Fast Scan Converter", Parts I and II, QST, March 1975, pp. 33–40 and May 1975, pp.28–46.

In digital storage, the picture information is represented in discrete memory cells. This means that the picture is "quantized" both in space (two dimensions, $x$ and $y$), and in grey shades. Because it is desirable to minimize the cost of the memory, and to minimize information transmission time, it is desirable to use as few memory cells as possible to represent the picture. While the possible arrangements can vary widely, in the following discussion, an example is considered, wherein the information stored in the memory represents a picture composed of 128 horizontal scan lines, each of which contains 128 picture element locations and 16 grey shades for each picture element intensity value. Since it takes 4 bits to represent 16 grey shades, the required memory capacity is 128 times 128 times 4 memory cells.

An analog video signal produced from information stored in such a memory for display on a television monitor would include 128 horizontal scan lines, with each line consisting of 128 picture element locations, as shown in FIG. 1. The picture array is square (128 and 128). However, because information typically is filled in along scan lines between the picture element locations by lateral extension of each picture element location, but not filled in between the scan lines, the scan lines are too noticeable. Therefore, it is desirable to "fill in" information between the scan lines. This can be done by simply displaying each horizontal scan line twice in succession, as shown in FIG. 2. In FIG. 2, the scan lines labeled 1a, 2a, etc. provide exactly the same information as do the previously displayed lines (1, 2, etc.), thus reducing the gap between the displayed scan lines.

However, the visual quantization effect produced by this kind of display is that of tiny "squares" in the picture, as indicated by box 10 in FIG. 2. An example of a portion of such a picture is illustrated in FIG. 3.

Attempts have been made to reduce this "quantization" effect in slowscan television apparatus. For example, Steber describes a system for "smoothing" the picture by providing that the intensity in each picture element location of the intermediate scan lines (1a, 2a, etc.) represents the averageof the intensities in the adjacent picture element locations that are in the scan lines above and below (1, 2, etc.). Additionally, or alternatively, it has been suggested that the picture element locations can be broken in half horizontally and that the intensity of one of the halves be made to be the average of the intensities of the two half-elements on either side thereof. For example, the intensity in element location 1c would be the average of the intensity in element locations 1b and 2b.

This process is roughly equivalent to low-pass filtering the picture and the resultant effect is to "soften" the picture and make it appear less "sharp" . Such an effect is not necessarily desirable.

SUMMARY OF THE INVENTION

In accordance with the present invention, the quantizing effect is greatly diminished without losing the apparent sharpness of the displayed picture.

The present invention is an apparatus, such as a slow-scan television apparatus, wherein an enhanced video signal is produced from information stored in a digital memory. The stored information represents a video signal intensity in each of a plurality of picture element locations within a plurality of scan lines. The apparatus includes means for producing an analog video signal for display from information stored in a digital memory; and is characterized by means for blanking the analog video signal during the first half of each picture element location during alternately displayed lines and for blanking the analog signal during the last half of each picture element location during the remaining alternately displayed lines.

An example of a portion of a picture produced in accordance with the present invention is illustrated in FIG. 4. Both FIGS. 3 and 4 are produced from the same digitally stored information. The appearance of the television picture shown in FIG. 4 somewhat resembles a "half-tone" as employed in the printing industry. It is not at all the same, however, since each dot in the television picture represents intensity information, whereas the "half-tone" process is strictly black-and-white (ink on paper or no ink on paper).

DESCRIPTION OF THE PREFERRED EMOBODIMENT

Figure 1:
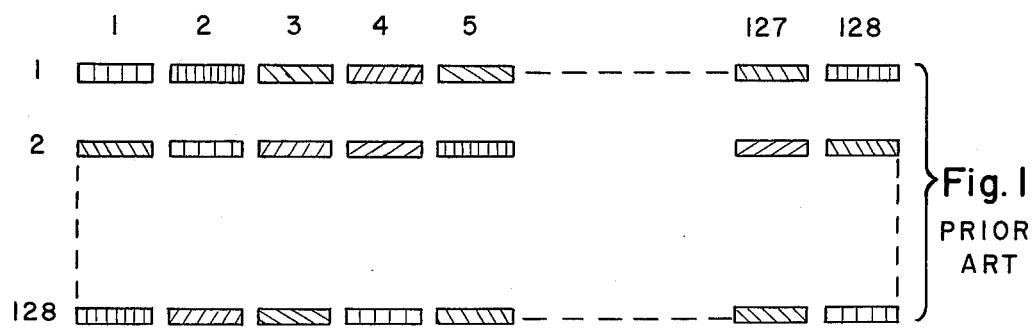
FIG. 1 shows a series of horizontal scan lines having picture element locations in a prior art television picture display.
Figure 2:
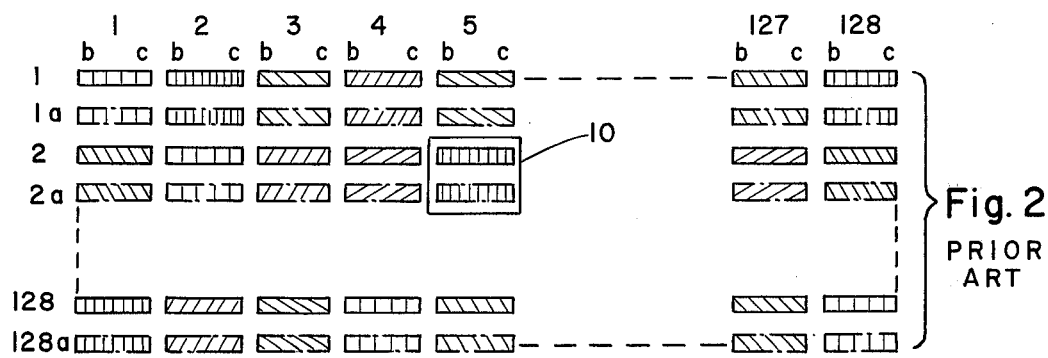
FIG. 2 shows a series of scan lines wherein each scan line as shown in FIG. 1 is repeated and shown a second time. This also is prior art.
Figure 3:
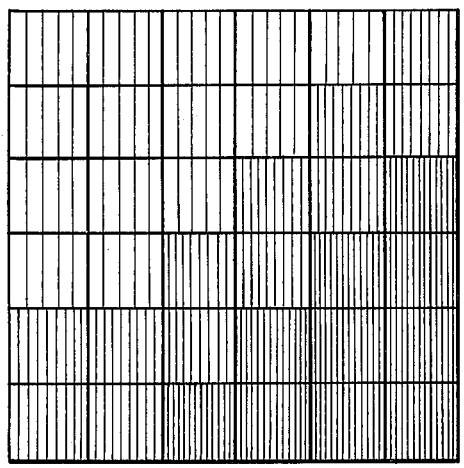
FIG. 3 is an illustration of a portion of a prior art television picture produced when using the scan line repetition scheme shown in FIG. 2.
Figure 4:
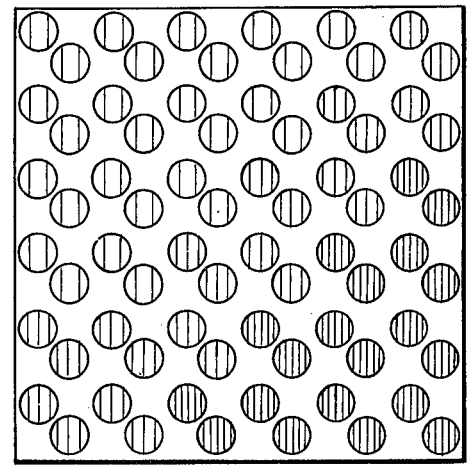
FIG. 4 is an illustration of a portion of a television picture produced from the same digitally stored information as the picture of FIG. 3, as enhanced in accordance with the present invention.
Figure 5:
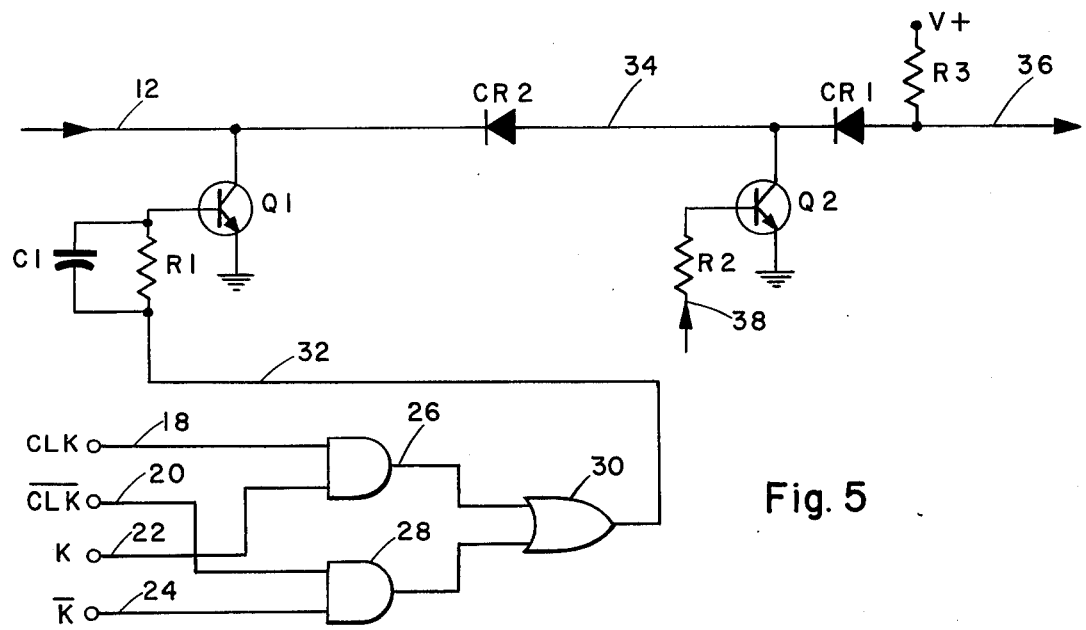
FIG. 5 is a schematic circuit diagram of a blanking circuit for providing an enhanced video signal in accordance with the present invention.
Figure 6A:
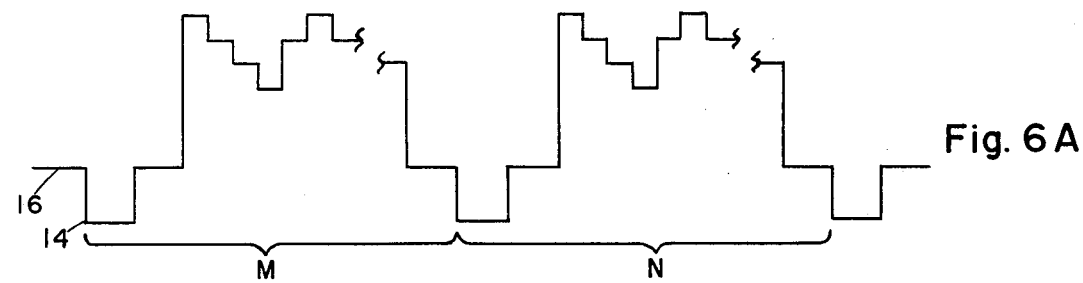
FIGS. 6A through 6F inclusive shows voltage waveforms of signals present in different portions of the circuit of FIG. 5.

Referring to FIG. 5, an analog video signal produced from the digitally stored video information is received on line 12. This analog video signal has a voltage waveform as shown in FIG. 6A. Each successive pair of scan lines M and N in this analog signal contains identical video signal intensity information for correspondingly positoned picture element locations. The video signal has a sync level 14 and a blanking level 16.

Figure 6B:
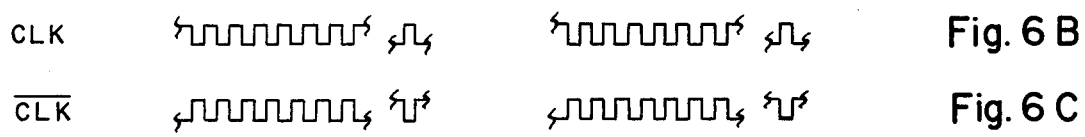
Figure 6C:
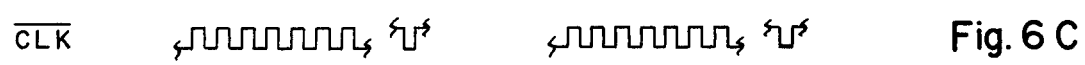

Input lines 18 and 20 receive oppositely valued digital clocking signals CLK and $\overline{CLK}$, as shown in FIGS 6B and 6C respectively. The transition rate of the clocking signals CLK and $\overline{CLK}$ is twice the frequency of the picture element locations in each scan line of the analog video signal.

Figure 6D:
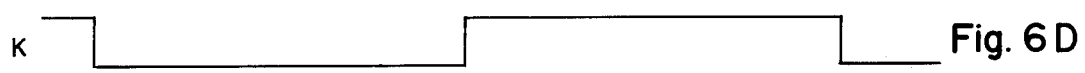
Figure 6E:

Input lines 22 and 24 receive oppositively valued digital signals K and $\overline{K}$ as shown in FIGS. 6D and 6E respectively. The transition rate of digital signals K and $\overline{K}$ corresponds to the horizontal scan rate of the analog video signal.

The clocking signals CLK and $\overline{CLK}$ received on lines 18 and 20 and the digital signal K and $\overline{K}$ received on lines 22 and 24 are processed through a pair of AND gates 26 and 28 and an OR gate 30 to provide a logic signal on line 32 for driving a transistor switch Q1 to blank the analog video signal on line 12 in accordance with the logic expression: $CLK \cdot K + \overline{CLK} \cdot \overline{K}$.

Figure 6F:
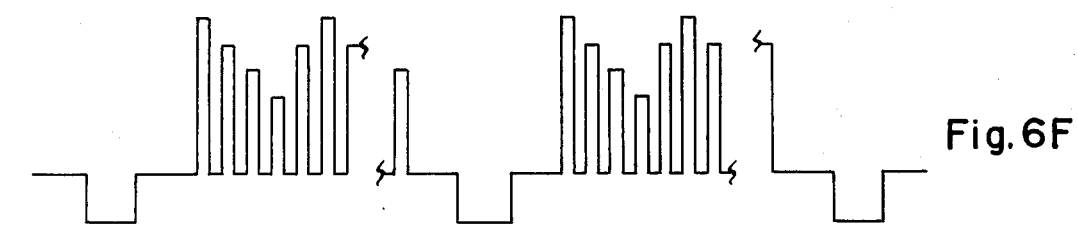

Accordingly, the analog video signal on line 12 is blanked during the first half of each picture element location when horizontal scan line M is displayed and is blanked during the second half of each picture element location when horizontal scan line N is displayed. The waveform of the resultant enhanced video signal is shown in FIG. 6F. This blanking sequence is repeated for each successively displayed pair of video scan lines.

The enhanced video signal is provided at output 36 for display on a television monitor. The horizontal and vertical sync levels are supplied to the analog video signal received on line 34 by a transistor switch Q2 in response to signals received on line 38.

The embodiment described herein is applicable when non-interlaced video fields are displayed. However, the present invention is also applicable when interlaced video fields are displayed; in which case the video signal is blanked during the first half of each picture element locationin each scan line of one field and blanked during the last half of each picture element location in each scan line of the other interlaced field.

Having described our invention, we now claim:

1. Apparatus for producing a video signal from information stored in a digital memory, said stored information representing the video signal intensity in each of a plurality of picture element locations within a plurality of scan lines, comprising, means for producing an analog video signal for display from said stored information, wherein the improvement comprises:

means for blanking said analog video signal during the first half of each picture element location during alternately displayed lines and for blanking said analog video signal during the last half of each picture element location during the remaining displayed lines.

2. A slow-scan television apparatus wherein a video signal is produced for display from information stored at a slow scan rate in a digital memory, said stored information representing the video signal intensity in each of a plurality of picture element locations within a plurality of scan lines, comprising, a digital memory;

means for storing said information in said memory at a slow scan rate;

means for providing an analog video signal for display from information stored in said digital memory, wherein the improvement comprises;

means for blanking said analog video signal during the first half of each picture element location during alternately displayed lines and for blanking said analog video signal during the last half of each picture element location during the remaining alternately displayed lines.

* * * * *